US008261983B2

(12) United States Patent
Sarma (10) Patent No.: US 8,261,983 B2
(45) Date of Patent: Sep. 11, 2012

(54) GENERATING CUSTOMIZED PACKAGING (75) Inventor: Subramonia P. Sarma, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 104 days.

(21) Appl. No.: 12/640,324

(22) Filed: Dec. 17, 2009

(65) Prior Publication Data

US 2012/0072011 A1    Mar. 22, 2012

(51) Int. Cl.
*G06K 5/00*    (2006.01)
(52) U.S. Cl. .................................. 235/385; 235/380
(58) Field of Classification Search .................. 235/385, 235/380, 383
See application file for complete search history.

(56) References Cited

U.S. PATENT DOCUMENTS

| 2003/0166443 | A1* | 9/2003 | May ............................... 493/320 |
| 2003/0236715 | A1* | 12/2003 | Leo ................................. 705/26 |
| 2005/0004878 | A1* | 1/2005 | Malone ......................... 705/400 |
| 2007/0034545 | A1* | 2/2007 | Sabalaskey et al. ........... 206/575 |
| 2008/0319566 | A1* | 12/2008 | McGuinness, Jr. ............. 700/97 |

* cited by examiner

*Primary Examiner* — Daniel St.Cyr
(74) *Attorney, Agent, or Firm* — Thomas, Kayden, Horstemeyer & Risley, LLP (57) ABSTRACT

Disclosed are various embodiments of generating customized packaging for an item associated with an order. A request to generate customized packaging for an item associated with an order is received. A user interface allowing a user to participate in design of the customized packaging is generated. Customized packaging is then generated based upon the customized packaging selected and/or designed by the user.

19 Claims, 4 Drawing Sheets

GENERATING CUSTOMIZED PACKAGING

BACKGROUND

Users may desire customized packaging when purchasing items and/or products in an electronic commerce system. Users may also desire to customize packaging used to package an item beyond certain predetermined options available in the electronic commerce system. Users may also desire that items ordered in an electronic commerce system be packaged with gift wrapping, etc. and shipped to a destination that is also designated by the user.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments disclosed herein relate to providing customized packaging for a user ordering an item or product in an electronic commerce system. In one embodiment, a user purchasing one or more items in an electronic commerce system may desire to have custom packaging provided with the item (e.g., gift wrapping and/or a card on or in the packaging of the item). Accordingly, embodiments herein can allow such a user to participate in the design of the custom packaging that is provided for the item.

Embodiments of the disclosure can allow a user to select one or more images that can be incorporated into the custom packaging. As a non-limiting example, embodiments herein can allow a user to upload an image that can be imprinted onto gift wrapping that is a part of the custom packaging selected by a user when purchasing an item. As another example, embodiments herein can allow a user to upload an image of a hand-written message that can be imprinted on a card provided as a part of custom packaging selected by the user. Accordingly, embodiments of the disclosure can provide user interfaces allowing a user, in the process of purchasing or placing an order for an item, to participate in the design of custom packaging provided with the item.

Figure 1:
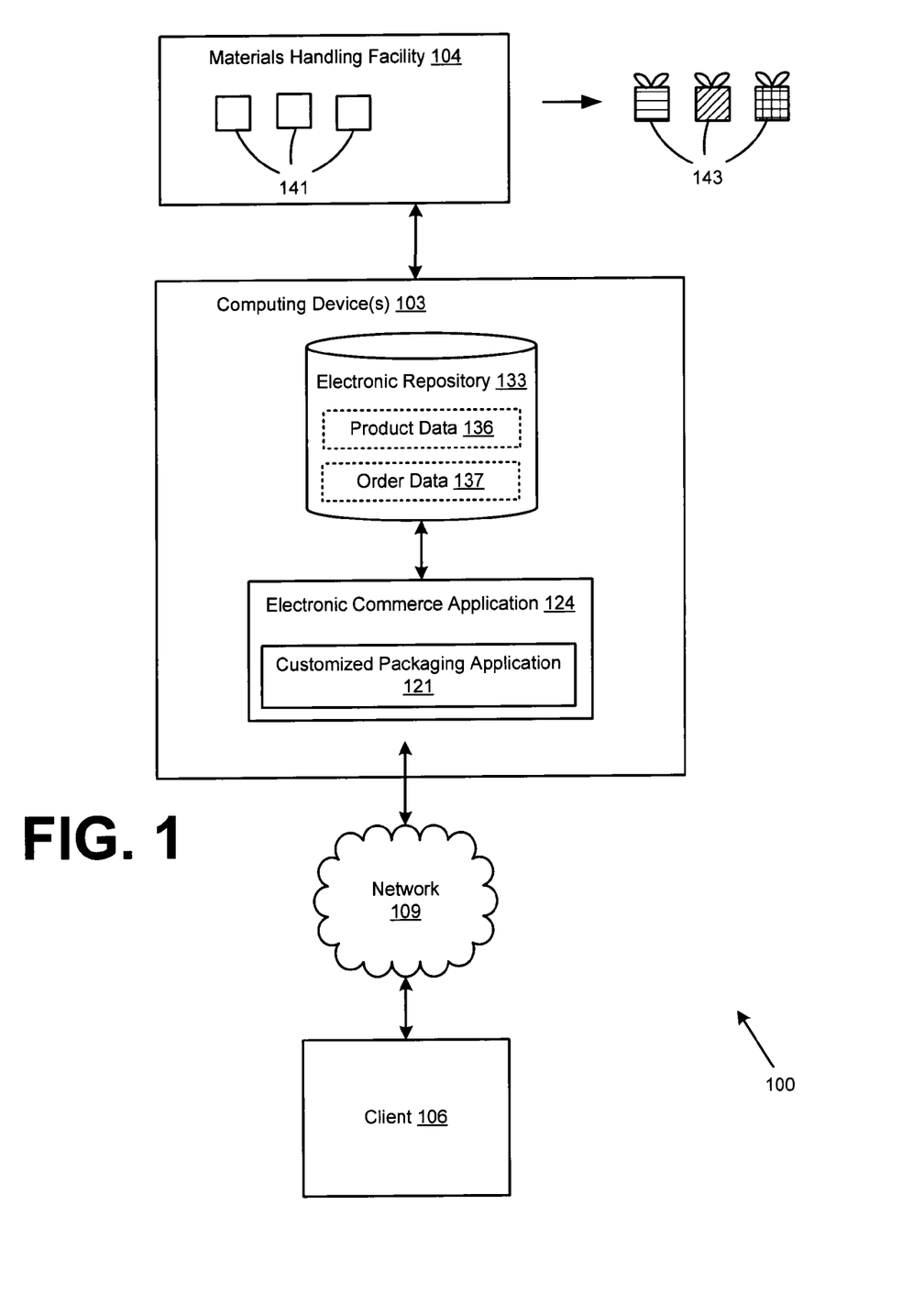
FIG. 1 is a drawing of a networked environment according to various embodiments of the present disclosure.

With reference to FIG. 1, shown is a networked environment 100 for providing customized packaging for items that includes, for example, at least one computing device 103 employed in conjunction with the operation of at least one materials handling facility 104. In the depicted example, the networked environment 100 also includes at least one client 106. In one embodiment, the at least one computing device 103 can implement an electronic commerce system that receives and processes orders for products and/or items from a client 106. Orders can be fulfilled by a materials handling facility 104, wherein items are picked from inventory and shipped to a destination. In some cases, a user may request that one or more items in an order be provided with customized packaging. Customized packaging can include customized gift wrapping, a card imprinted with a message from the user, etc. Accordingly, the computing device 103 can facilitate the generating of customized packaging according to the desires of a user.

In the depicted non-limiting example of FIG. 1, the computing device 103 may represent multiple computing devices 103 that may be arranged to work in coordination with each other. Alternatively, such computing devices 103 may be arranged in some other manner, as can be appreciated. As a non-limiting example, various components of the depicted computing device 103 can be separate or segmented onto various computing devices 103 that can communicate over a network. Likewise, the client 106 is representative of multiple clients 106 that are configured to access information on the computing device 103. Additionally, the materials handling facility 104 may represent a plurality of materials handling facilities 104 that can also be geographically disparate. Both the computing device 103 and the client 106 are coupled to the network 109.

The computing device 103 is configured to execute various applications such as, for example, a customized packaging application 121, an electronic commerce application 124, and other applications. The customized packaging application 121 is executed to allow a user to select customized packaging for items or products the user is ordering from an electronic commerce system implemented by the computing device 103. In other words, the customized packaging application 121 allows a user select gift wrapping, customized cards, or other customized packaging for one or more items in an order. The electronic commerce application 124 may include network page server functionality, such as a hypertext transfer protocol (HTTP) server. In some embodiments, the functionality of the customized packaging application 121 may be included in the electronic commerce application 124. In other embodiments, the customized packaging application 121 may be executed as a sub-module of the electronic commerce application 124, or as a separate, standalone application, etc. It should be understood that the depicted embodiment of an electronic commerce application 124 executing the customized packaging application 121 is but one example.

Also, the computing device 103 can include at least one electronic repository 133, which may comprise data and applications operable to provide access to the data stored therein. It should be appreciated that the electronic repository 133 may or may not reside within a computing device 103, but may be accessible via a network to the computing device 103. The electronic repository 133 may be used to store product data 136 and other data related to products or items in an electronic commerce system. Product data 136 comprises data regarding items offered for sale by one or more merchants. Product data 136 may include many fields of data regarding each item, such as, but not limited to, the following: product category, title, keywords, description, price, weight, shipping methods, related images, reviews, similar items, meta data, hidden text, a list of merchants selling the item, stock number, other associated categories, page view history, etc. The electronic repository 133 can also include order data 137, which comprises information regarding orders placed by users manipulating a user interface on a client 106. Order data 137 may include an order identifier, items within an order, payment information as well as data regarding customized packaging for items within an order. Product data 136 and order data 137 can also include other data related to products and orders, respectively, as can be appreciated, but are not necessary to discuss herein for an understanding of the various embodiments of the disclosure.

The depicted network 109 may include, for example, any type of networked environment such as the Internet, intranets, local area networks, wide area networks (WANs), wireless networks, cellular networks, phone networks, or other suitable networks as can be appreciated or any combination of two or more such networks. According to various embodiments, the computing device 103 includes various applications that are executed, for example, to effectuate the handling and processing of orders, inventory and shipment tracking, handling, and fulfillment in an electronic commerce system. To this end, an electronic commerce application 124 is executed in the computing device(s) 103, which may in turn execute other systems to facilitate interacting with a client 106 via the network 109. Systems running in an electronic commerce application 124 may also include, but are not limited to, order fulfillment systems, dynamic network or web page servers, inventory systems, or other systems as can be appreciated. However, such systems are not described herein in detail.

At least one client 106 communicates with various services on the computing devices 103 as will be described. The client 106 may comprise various types of computer systems such as, for example, a desktop, laptop, or other computer system with like capability. To this end, the client 106 may also comprise a personal digital assistant, cell phone, or other portable device with like capability as can be appreciated. The client 106 may interface with the computing device 103 using various applications such as a browser application, dedicated applications, or other applications as can be appreciated. In one embodiment, various user interfaces can be generated on a display device of the client 106 to facilitate interaction with the various systems or components implemented on the computing device 103. In this way, users may interact with the electronic commerce application 124 in order to view and/or order items available in an electronic commerce system.

In addition, according to embodiments of the disclosure, users can interact via a client 106 with the customized packaging application 121 in order to select and/or create customized packaging for an item ordered from the electronic commerce system. Items that are ordered from the electronic commerce system can in turn be packaged in the customized packaging and fulfilled by the materials handling facility 104. The customized packaging application 121 can initiate the manufacture and/or printing of the customized packaging created or selected by a user in the materials handling facility 104 as described in further detail herein. It should also be appreciated that, in some embodiments, the materials handling facility 104 can include one or more computing devices that can facilitate manufacture of customized packaging created or selected by a user, which will also be described in further detail herein.

The materials handling facility 104 may include data processing systems that communicate with the computing device 103 via the network 109 or other communications link. Additionally, certain components to facilitate embodiments of the disclosure may be implemented in one computing device 103, while other components may be implemented in a second computing device 103. The functionality discussed herein as occurring in one computing device 103 (as a non-limiting example) is but one example. For instance, a first computing device may execute software applications or components to facilitate the receiving and processing of orders in an electronic commerce system, while a second computing device may execute software applications or components to facilitate the packaging and fulfillment of orders in a materials handling facility 104. Likewise, a first computing device may execute software applications or components to facilitate the design or creation of customized packaging on behalf of a user, and a second computing device may execute software applications or components to facilitate the printing and packaging of an item in the customized packaging according to the desires of a user.

A materials handling facility 104 may include one or more of, but is not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 104 is described herein with reference to a fulfillment center and/or inventory warehouse, it is understood that a materials handling facility 104 provides one example of many other types of environments to which the principles described herein apply.

The materials handling facility 104 may comprise, for example, a large warehouse or other structure that includes at least one packaging area where order items 141 that are associated with user orders can be packaged and/or shipped. Accordingly, order items 141 can be packaged in customized packaging and custom packaged items 143 can be shipped to a destination according to an order placed in an electronic commerce system as directed by a customized packaging application 121 executed in a computing device 103.

Now that the various components of the depicted non-limiting networked environment 100 have been described, various aspects of the customized packaging application 121, which facilitates the creation of customized packaging and the shipment of items with customized packaging, will be described. In the context of an order placed by a user in an electronic commerce system, the customized packaging application 121 can receive a request from a user to include customized packaging with an item in the order. Customized packaging can include gift wrapping and/or a card.

A user requesting customized packaging can participate in the design of gift wrapping used to package an item in an order. As one example, if a user is ordering an item in an electronic commerce system as a gift, the user can design gift wrapping that is used to wrap the gift before it is shipped to a recipient from the materials handling facility 104. In one embodiment, the user can upload one or more images that can be incorporated into the gift wrapping that is a part of the customized packaging. For example, the user may upload an image of himself, an image of the recipient of a gift, or any other image available to the user. Accordingly, the customized packaging application 121 can generate customized packaging that includes gift wrapping incorporating the user uploaded image. In this example, the user may also designate the size, location, effects, or other properties of the uploaded image, and the customized packaging application 121 can place the image on the gift wrapping according to the desires of the user.

For example, the user can designate or allow the customized packaging application 121 to designate that the uploaded image be placed in a particular location on the gift wrapping.

The designated image can be centered or placed on any location on the gift wrapping. Alternatively, the user can designate that the uploaded image be tiled or collaged over the gift wrapping so that when an item is packaged using the gift wrapping, image placement is not a concern. The user can also designate other properties of the gift wrapping in the above example. The user can designate the color, material, patterns, or other properties of the gift wrapping in addition to designating an uploaded image to be incorporated in the gift wrapping.

In some embodiments, the user can designate an image available via the network 109 to be incorporated in the gift wrapping. Accordingly, the user can designate a uniform resource locator (URL) of one or more images the user desires to be incorporated into the gift wrapping. In other embodiments, the user can designate an image of himself, the recipient, or any other person or object that is tagged in a social networking system. Accordingly, the customized packaging application 121 and/or client 106 can retrieve an image via a URL and/or connect to the social networking system on behalf of the user to allow the user to select images available to him via the social network. In this example, the customized packaging application 121 can also suggest one or more images available in the social networking system based on the identity of the user and/or the recipient, as identity information regarding the user and/or recipient of the gift can be accessible to the electronic commerce application 124.

The customized packaging application 121 can also facilitate the generating of cards that are customized by the user. In one embodiment, the user can participate in the design of a card that is included with an item as part of the customized packaging. In the same way a user can upload and/or designate one or more images to be incorporated in gift wrapping, the customized packaging application 121 can provide similar functionality for cards that can be included as a part of customized packaging of an item. The customized packaging application 121 can also allow a user to create a handwritten message for imprinting on a card that is included with an item. In one embodiment, the user can create a handwritten message and subsequently create an image of the handwritten message, which can be imprinted on a card, gift wrapping, or other types of customized packaging. In other embodiments, the user can, on a client 106, use an input device that captures handwriting, which can be uploaded to the customized packaging application 121 for use with gift wrapping, a card, etc. Additionally, the user can create an audio or video message that can be uploaded to the customized packaging application 121 for use in customized packaging having audio or video playback capabilities. As one non-limiting example, a card having a memory device and an audio playback system can be included as a part of customized packaging of an item that contains an audio file recorded by the user via a client 106.

The customized packaging application 121 can also select or suggest customized packaging based upon various factors. The customized packaging application 121 can provide a user with various design templates that can act as a starting point from which a user can further customize. As one example, the customized packaging application 121 can suggest or select context sensitive customized packaging that is based in part upon the particular item for which a user desires customized packaging. For example, if a user orders a golf club in an electronic commerce system and desires customized packaging for the golf club, the customized packaging application 121 can select or suggest golf themed gift wrapping or cards that can be included in shipment of the item. As another example, the customized packaging application 121 can select or suggest birthday themed customized packaging if the identity of a recipient and birth date is accessible to the electronic commerce application 124. Accordingly, the customized packaging application 121 can suggest a particular context sensitive customized packaging that a user can select or further customize with user designated imagery, etc.

Additionally, the customized packaging application 121 can facilitate the generating of gift wrapping and/or cards based at least upon other aspects of an item. For example, the dimensions of an item can be known and/or stored (in one embodiment) in the product data 136 of the electronic repository 133. Accordingly, the customized packaging application 121 can retrieve an item's dimensions and determine a minimum amount of gift wrapping that should be employed to package the item to minimize waste. In other embodiments, the customized packaging application 121 can determine, based at least upon an item's dimensions, where to place user designated imagery or other imagery on gift wrapping destined for a particular item to maximize aesthetic appeal of the customized packaging. For example, if a user designates that imagery for customized gift wrapping be centered on a particular side of an item when the item is packaged, the customized packaging application 121 can calculate where the imagery should be placed on the gift wrapping so that the desires of the user in this regard can be carried out. As an additional example, if a user does not designate a particular orientation of user designated imagery on gift wrapping, the customized packaging application 121 can place the imagery on the gift wrapping such that the imagery does not overlap a corner or appear in an undesirable location on the gift wrapping.

To further facilitate this functionality, the customized packaging application 121 can, in the case of customized packaging including gift wrapping, imprint guide markings on either side of the customized packaging to guide personnel in a materials handling facility 104 in packaging the item. As an example, if user desires that user designated imagery appear centered on a particular side of an item when the item is packaged, the customized packaging application 121 can generate customized packaging that includes gift wrapping with corresponding guide markings on a reverse side of the gift wrapping to help ensure these desires are carried out.

Upon generating customized packaging as described above, the customized packaging application 121 can generate and/or store a digital representation of the customized packaging (e.g., gift wrapping, card, etc.). The digital representation of the customized packaging can be stored in the order data 137 or other location as can be appreciated. The digital representation of the customized packaging can also be stored and/or associated with a user profile in various ways. As one example, the digital representation can be saved in a user profile so that a user may use the customized packaging for other items associated with other orders. Additionally, the customized packaging can be associated with a person and/or entity for whom an item is ordered or to whom it is shipped. As an additional non-limiting example, the digital representation of the customized packaging can be associated with a particular event, such as a birthday, a holiday, etc., so that a user may use the customized packaging for similar events and/or for the same or similar person or entity to whom an item is shipped. A user may further customize and/or modify design and other attributes of the digital representation of customized packaging that is associated with a user profile as can be appreciated.

The customized packaging application 121 can also use the digital representation to provide a packaging preview to a user. The packaging preview can illustrate how an item selected by the user would appear as packaged using the customized packaging selected by the user. As noted above, the dimensions of an item can be known or ascertained, and the packaging preview can display the item with the customized packaging.

Additionally, the customized packaging application 121 can use the digital representation of the customized packaging to facilitate creation, manufacture, and/or printing of customized packaging in the materials handling facility 104 that fulfills an order that includes one or more items for which customized packaging is requested by a user. The customized packaging application 121 can interface with computing devices, printing devices or other devices that can cause the customized packaging to be manufactured and/or delivered to a materials handling facility 104, where it can be used to package an item.

As can be appreciated, in a materials handling facility 104, when orders are submitted to an electronic commerce system, the orders can be received or transmitted to a materials handling facility 104 and processed for fulfillment. Order identifiers and item identifiers can be employed to ensure that the proper items are picked from inventory in a materials handling facility 104 to fulfillment as designated in an order. Accordingly, personnel in a materials handling facility 104 can pick inventory and assemble items for a given order and/or shipment destination in a packaging area. An order identifier can be transmitted to the electronic commerce application 124 and/or customized packaging application 121, and the customized packaging application 121 can initiate the creation, manufacture, and/or printing of the appropriate customized packaging for one or more items in a particular order.

Figure 2:
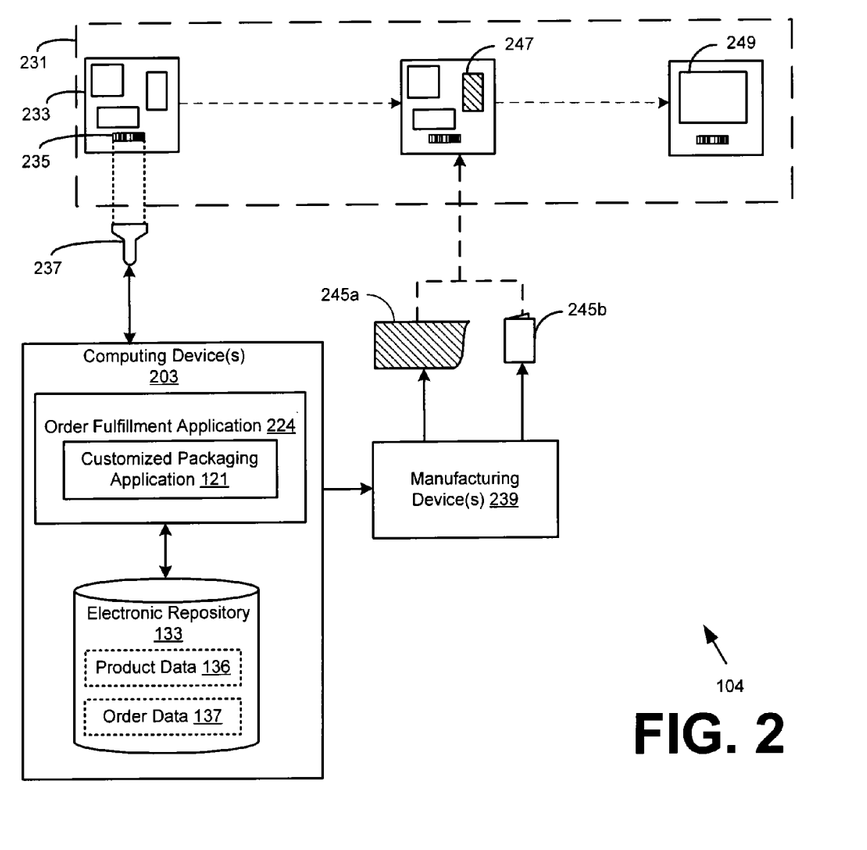
FIG. 2 is a drawing of a materials handling facility of the networked environment of FIG. 1 according to various embodiments of the present disclosure.

Reference is now made to FIG. 2, which illustrates an alternative depiction of a materials handling facility 104. The materials handling facility 104 can also include a computing device 203 that facilitates creation of customized packaging as described above. The computing device 203 can be structured similarly to the computing device 103 of FIG. 1, or in various other configurations as can be appreciated. The computing device 203 can also include an electronic repository 133 that houses the product data 136 and order data 137. In some embodiments, the computing device(s) 203 in a materials handling facility 104 can be in data communication with an electronic repository 133 facilitating an electronic commerce system. For example, the computing device 203 in a materials handling facility 104 can be in communication with a computing device 103 implementing an electronic commerce system in order to access product data 136 and/or order data 137. Accordingly, it should be appreciated that an electronic repository 133 may not be present in a computing device 203 in a materials handling facility 104, and that the depiction in FIG. 2 is merely exemplary.

An order fulfillment application 224 can be executed in the computing device 203 to facilitate fulfillment of orders placed in an electronic commerce system by the materials handling facility 104. The order fulfillment application 224 can retrieve orders from order data 137 and inform personnel or devices configured to pick items from inventory in the materials handling facility 104 to facilitate assembling of orders in a packaging area 231. To further facilitate assembling of items in the packaging area 231, items can be assembled in an order container 233 or other container that can be identified with an order identifier 235. An order container 233 can include a bin, tote, pallet, or other container as can be appreciated. The order identifier 235 can correspond to an order placed in an electronic commerce system and accessible to the order fulfillment application 224 and/or stored in the order data 137. An order identifier scanner 237 can be employed to identify an order to which an order container 233 corresponds. The order identifier scanner 237 can be in data communication with the computing device 203.

The computing device 203 can execute the customized packaging application 121, which, in the non-limiting example of the depicted materials handling facility 104 of FIG. 2, can implement the functionality of initiating manufacture and/or printing of customized packaging. It should be appreciated that all of the functionality of the customized packaging application 121 can be implemented in a single computing device in a single installation and that the depicted examples of FIGS. 1 and 2 illustrates one case of various parts of the functionality of the customized packaging application 121 being executed in different installations.

In the depicted example, the order fulfillment application 224 can receive an order identifier 235 from the order identifier scanner 237 when an order container 233 is in the packaging area 231. If the order data 137 associated with the order identifier 235 indicates that customized packaging is in turn associated with the order, the customized packaging application 121 can facilitate its manufacture. The customized packaging application 121 can, in one embodiment, retrieve the digital representation of the customized packaging from the order data 137 and initiate manufacture, creation, and/or printing of the customized packaging in one or more manufacturing devices 239. A manufacturing device 239 can include a printing device or any number of other devices configured to create customized packaging configurable by a user or an electronic commerce system.

In the depicted example, the customized packaging application 121 initiates printing of customized packaging 245 in a manufacturing device 239 and/or printing device. The depicted non-limiting exemplary customized packaging 245 includes gift wrapping 245a that can be used to package the item and a card 245b that can be included with the item that is associated with the order identifier 235. As noted above, the customized packaging 245 can be customized by a user or selected and/or suggested by the customized packaging application 121. Accordingly, an item in an order associated with the order identifier 235 and be packaged with the customized packaging 245 manufactured by the manufacturing device 239. The customized packaged item 247 can be packaged by personnel or workers in the materials handling facility 104 or by an automated packaging device as directed by the customized packaging application 121. In the depicted example, the customized packaged item 247 can be gift wrapped with the customized gift wrapping 245a and the customized card 245b can be included with the customized packaged item 247. Accordingly, in one embodiment, the items in the order identified by the order identifier 235 can then be packaged in one or more outgoing shipments 249 intended for a destination described in the order data 137 associated with the order identifier 235.

Figure 3:
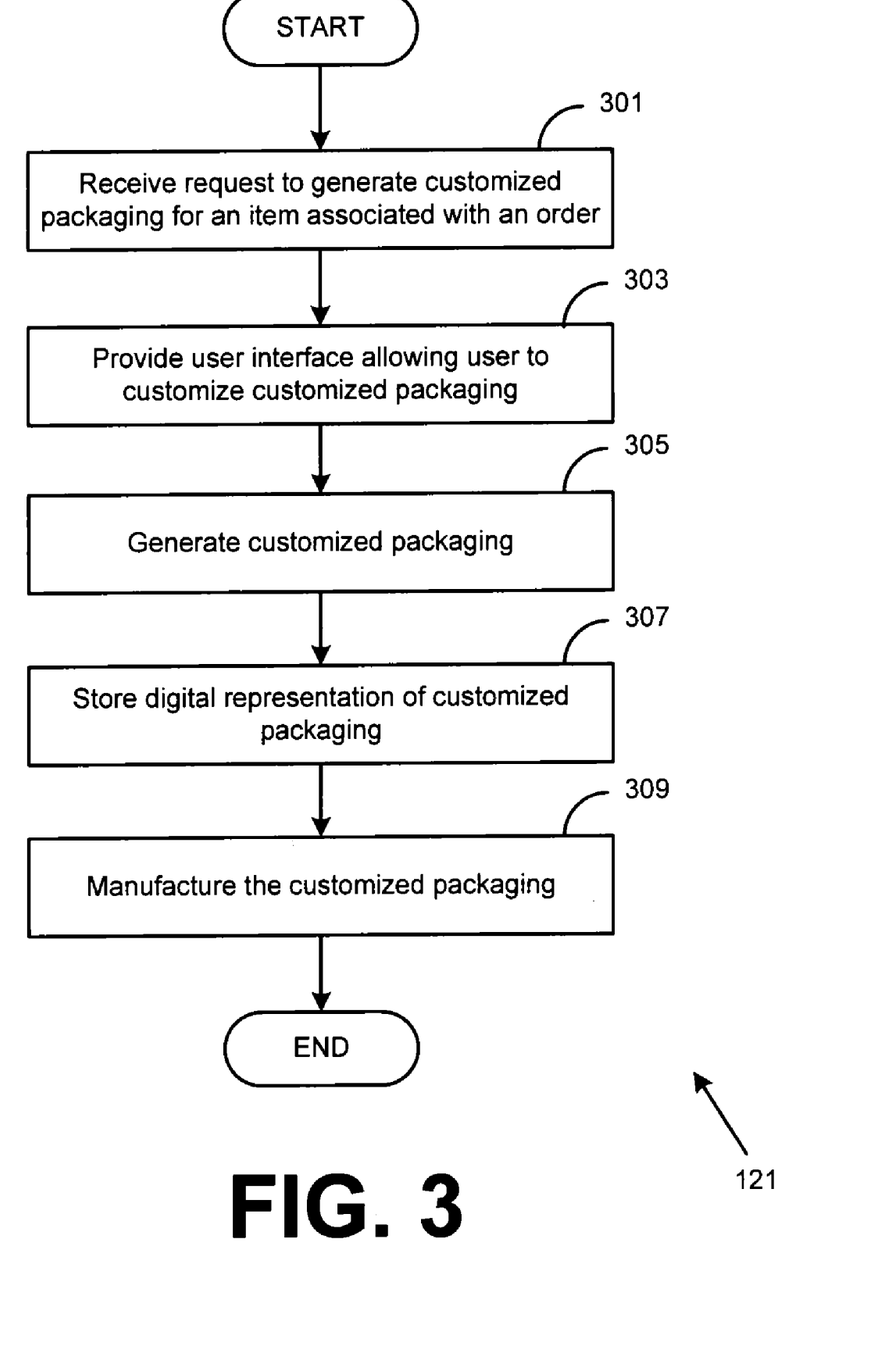
FIG. 3 is a flowchart that illustrates one example of functionality implemented as a portion of a customized packaging application executed in a computing device in the networked environment of FIG. 1 and/or the materials handling facility of FIG. 2 according to various embodiments of the present disclosure.

Referring next to FIG. 3, shown is a flowchart of one example of the functionality of the customized packaging application 121 (FIGS. 1 and 2) according to one embodiment. Alternatively, the flowchart of FIG. 3 may be viewed as depicting steps of a method implemented in a computing device executing a customized packaging application 121 according to various embodiments. It is understood that the flowchart of FIG. 3 is one example of the operation of the customized packaging application 121, where the customized packaging application 121 may be implemented in varying ways to accomplish the same functionality.

First, in box 301, the customized packaging application 121 receives a request to generate customized packaging for an item associated with an order. Next, in box 303, the customized packaging application 121 can provide a user interface allowing a user to participate in the design of customized packaging. As noted above, the customized packaging can include gift wrapping, a card, or other items that can be packaging with an item in an electronic commerce system. As described herein, a user can participate in the design of customized packaging, which is facilitated by the customized packaging application 121. In some embodiments, the customized packaging application 121 can suggest and/or select certain aspects of the customized packaging provided with an item, which can be modified by a user if the user desires.

In box 305, the customized packaging is generated, and in box 307, a digital representation of the customized packaging is stored. As noted above, the customized packaging can be generated and a digital representation stored in a first computing device. Accordingly, the digital representation can be retrieved in a second computing device in communication with a manufacturing device, where the customized packaging is manufactured in box 309. A manufacturing device can include, but is not limited to, one or more printing devices configured to print gift wrapping appropriately sized for a particular item, a printing device configured to print a card, etc.

Figure 4:
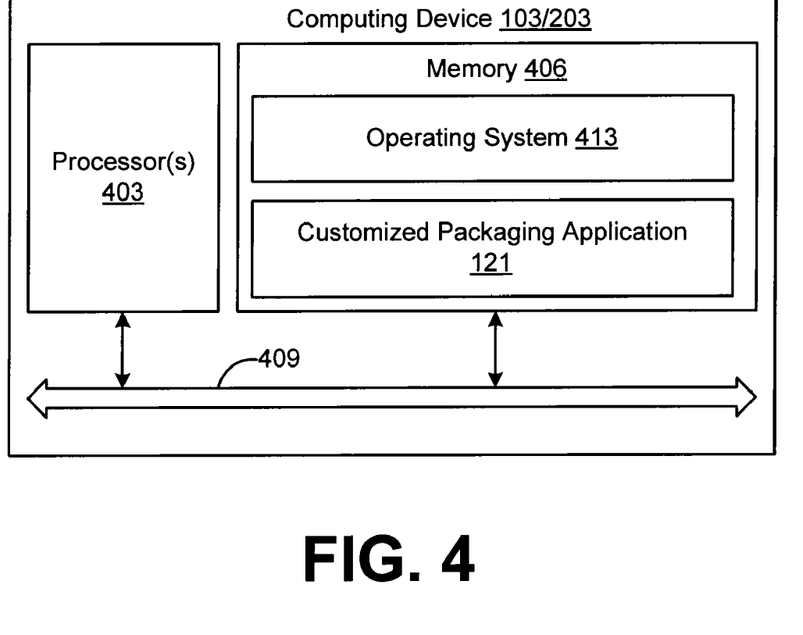
FIG. 4 is a schematic block diagram that provides one example illustration of a computing device executing a customized packaging application employed in the networked environment of FIG. 1 and/or the materials handling facility of FIG. 2 according to various embodiments of the present disclosure.

Referring next to FIG. 4, shown is a schematic block diagram of one example of a computing device 103/203 (FIGS. 1 and 2) according to an embodiment of the present disclosure. The computing device 103/203 includes at least one processor circuit, for example, having a processor 403 and a memory 406, both of which are coupled to a local interface 409. To this end, the computing device 103/203 may comprise, for example, a server computer or like device. The local interface 409 may comprise, for example, a data bus with an accompanying address/control bus or other bus structure as can be appreciated.

Stored in the memory 406 are several components and/or applications that are executable by the processor 403. In particular, stored in the memory 406 and executable by the processor 403 are an operating system 613, the customized packaging application 121, and potentially other applications such as an electronic commerce application 124, etc.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

The various applications or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as the customized packaging application 121 described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of the various applications and/or other components such as the customized packaging application 121 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and/or other components described herein such as the customized packaging application 121 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer readable medium including a customized packaging application executable by at least one computing device, the customized packaging application comprising:
   logic that receives a request to generate a customized packaging for an item in a product order in an electronic commerce system, the customized packaging comprising at least one of a gift wrapping and a card;
   logic that generates a customized packaging for the item by identifying dimensions of the item and determining a minimum amount of gift wrapping required to wrap the item, wherein at least one user designated image is incorporated into the customized packaging;
   logic that stores a digital representation of the customized packaging in a first computing device;
   logic that retrieves the digital representation of the customized packaging from the first computing device; and
   logic that initiates printing of the customized packaging in at least one manufacturing device.

2. A system, comprising:
   at least one computing device;
   at least one printing device in communication with the at least one computing device; and
   a customized packaging application executable in the at least one computing device, the customized packaging application further comprising:
   logic that receives a request to generate a customized packaging for an item in a product order in an electronic commerce system, the customized packaging comprising at least one of a gift wrapping and a card;
   logic that obtains at least one user identified image;
   logic that places the at least one user identified image on the customized packaging;
   logic that generates a representation of a customized packaging for the item by identifying dimensions of the item and determining a minimum amount of gift wrapping required to wrap the item; and
   logic that initiates printing of the customized packaging with the at least one printing device.

3. The system of claim 2, wherein the logic that initiates printing of the customized packaging in the at least one printing device further comprises:
   logic that identifies an order identifier associated with the product order; and
   logic that retrieves the representation of the customized packaging associated with the item in the product order.

4. The system of claim 2, wherein the logic that receives a request to generate a customized packaging further comprises logic that receives a hand written message from a user, and the logic that generates the representation of the customized packaging further comprises logic that places the hand written message on the customized packaging.

5. The system of claim 2, wherein the logic that generates the representation of the customized packaging further comprises logic that places at least one guide marker on the gift wrapping to direct wrapping of the item.

6. The system of claim 2, wherein the logic that places the at least one user identified image on the customized packaging further comprises logic that identifies a location on the gift wrapping to place the at least one user identified image, wherein the at least one user identified image can be centered on a side of the item upon wrapping of the item with the gift wrapping.

7. The system of claim 2, wherein the logic that places the at least one user identified image on the customized packaging further comprises logic that tiles the at least one user identified image on the gift wrapping.

8. The system of claim 2, wherein the logic that places the at least one user identified image on the customized packaging further comprises logic that generates a collage of the at least one user identified image and places the collage on the customized packaging.

9. The system of claim 2, wherein the at least one user identified image further comprises at least one of: an image uploaded by a user, an image identified by a user by a uniform resource locator, and an image associated with a person.

10. The system of claim 9, wherein the image associated with a person further comprises an image wherein the person is tagged, the image accessible in at least one of: a social networking system, an image hosting service, and via a uniform resource locator.

11. The system of claim 2, wherein the logic that receives a request to generate a customized packaging further comprises logic that selects a context sensitive packaging based on the item.

12. The system of claim 11, wherein the context sensitive packaging further comprises gift wrapping having disposed thereon at least one image, the image related to a use of the item.

13. A method, comprising the steps of:
receiving a request to generate a customized packaging for an item associated with an order in a first computing device;
providing a user interface allowing a user to participate in design of the customized packaging;
generating a customized packaging for the item in the first computing device by receiving at least one user identified image and placing the at least one user identified image on the customized packaging;
identifying dimensions of the item and determining a minimum amount of gift wrapping required to wrap the item;
storing a digital representation of the customized packaging in the first computing device; and
manufacturing the customized packaging with a manufacturing device.

14. The method of claim 13, further comprising the steps of:
identifying an order identifier in a materials handling facility associated with the order; and
retrieving the digital representation of the customized packaging from the first computing device to a second computing device in the materials handling facility.

15. The method of claim 13, wherein the at least one user identified image is at least one image selected from the group consisting of: an image uploaded by a user, an image identified by a user by a uniform resource locator, and an image associated with a person.

16. The method of claim 13, wherein the customized packaging further comprises at least one of a gift wrapping and a card.

17. The method of claim 16, wherein the step of generating the customized packaging further comprises the step of placing at least one guide marker on the gift wrapping, the guide marker configured to direct wrapping of the item with the gift wrapping.

18. The method of claim 13, further comprising the step of suggesting in the computing device a context sensitive packaging based on the item.

19. The method of claim 18, wherein the context sensitive packaging further comprises gift wrapping having disposed thereon at least one image, the image related to a use of the item.

* * * * *